(12) United States Patent
Nakamura et al.

(10) Patent No.: US 12,424,644 B2
(45) Date of Patent: Sep. 23, 2025

(54) SERVICE PROVIDING MOBILE UNIT

(71) Applicant: TOYOTA JIDOSHA KABUSHIKI KAISHA, Toyota (JP)

(72) Inventors: Masashi Nakamura, Toyota (JP); Zixun Mei, Tokyo-to (JP); Nobuyuki Tomatsu, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 463 days.

(21) Appl. No.: 17/961,209

(22) Filed: Oct. 6, 2022

(65) Prior Publication Data

US 2023/0110725 A1 Apr. 13, 2023

(30) Foreign Application Priority Data

Oct. 8, 2021 (JP) .................................. 2021-166326

(51) Int. Cl.
| | |
|---|---|
| *H01M 8/04746* | (2016.01) |
| *B60P 3/00* | (2006.01) |
| *G06Q 30/0645* | (2023.01) |
| *H01M 8/04082* | (2016.01) |
| *H01M 8/04089* | (2016.01) |
| *H01M 8/0444* | (2016.01) |

(52) U.S. Cl.
CPC ........... *H01M 8/04753* (2013.01); *B60P 3/00* (2013.01); *G06Q 30/0645* (2013.01); *H01M 8/04089* (2013.01); *H01M 8/04201* (2013.01); *H01M 8/0444* (2013.01); *H01M 2250/20* (2013.01)

(58) Field of Classification Search
CPC ........... H01M 2250/20; H01M 8/0444; H01M 8/04201; H01M 8/04089; H01M 8/04753; G06Q 30/0645; B60P 3/00
See application file for complete search history.

(56) References Cited

U.S. PATENT DOCUMENTS

| | | | |
|---|---|---|---|
| 6,755,225 B1 * | 6/2004 | Niedwiecki | F17C 7/02 |
| | | | 141/2 |
| 6,770,186 B2 * | 8/2004 | Rosenfeld | B60L 53/00 |
| | | | 204/266 |
| 7,373,315 B2 * | 5/2008 | Chernoff | B60G 17/0195 |
| | | | 705/26.1 |
| 10,947,036 B2 * | 3/2021 | Helou, Jr. | B64D 9/00 |
| 2022/0123332 A1 * | 4/2022 | Green | H01M 8/0432 |

FOREIGN PATENT DOCUMENTS

| | | |
|---|---|---|
| JP | 2003-056798 A | 2/2003 |
| JP | 2005-289439 A | 10/2005 |

* cited by examiner

*Primary Examiner* — James A Shriver, II
*Assistant Examiner* — Nicholas R. Kandas
(74) *Attorney, Agent, or Firm* — Sughrue Mion, PLLC

(57) ABSTRACT

A service providing mobile unit comprising the frame 2, movement-use wheels 4, 5 provided at the bottom part of the frame 2, hydrogen storage tank insert parts 10 formed inside the frame 2, and the fuel cell 40 arranged in the frame 2. A service for supplying hydrogen to the fuel cell 40 from the hydrogen storage tank 20 inserted in the hydrogen storage tank insert part 10, a service for lending out the hydrogen storage tank 20 inserted in the hydrogen storage tank insert part 10, a service for returning a used hydrogen storage tank 20 to the hydrogen storage tank insert part 10, and a service for storing the hydrogen storage tank 20 inserted into the hydrogen storage tank insert part 10 are provided.

25 Claims, 8 Drawing Sheets

FIG. 6

| MOBILE UNIT NO. | INSERT PART NO. | STATE OF USE | PURPOSE OF USE | TANK ID | USER ID | REMAINING AMOUNT OF HYDROGEN | REPLACEMENT NEEDED | LENDING POSSIBLE |
|---|---|---|---|---|---|---|---|---|
| k | 1 | EMPTY | | | | | | |
| | 2 | USED | | $x_1$ | $y_1$ | $w_1$ | ○ | |
| | 3 | USED | | $x_2$ | $y_2$ | $w_2$ | | |
| | 4 | USED | | $x_3$ | $y_3$ | $w_3$ | | ○ |
| | ⋮ | ⋮ | ⋮ | ⋮ | ⋮ | ⋮ | ⋮ | ⋮ |
| | n | USED | RETURN | $x_m$ | $y_m$ | | | |
| | 1 | USED | | $x_{m+1}$ | $y_{m+1}$ | | | |

SERVICE PROVIDING MOBILE UNIT

FIELD

The present invention relates to a service providing mobile unit.

BACKGROUND

Known in the past has been a hydrogen supply system designed to store hydrogen in a reusable highly general use hydrogen storage container, transport this hydrogen storage container to any location where a fuel cell is installed, and supply hydrogen from this hydrogen storage container to the fuel cell (for example, see Japanese Unexamined Patent Publication No. 2003-56798).

SUMMARY

However, in this hydrogen supply system, no suggestion is made at all about a mobile unit able to provide various services with respect to a hydrogen storage container.

According to the present invention, there is provided a service providing mobile unit comprising:
a frame,
movement-use wheels provided at a bottom part of the frame,
a plurality of hydrogen storage tank insert parts formed at the frame, and
a fuel cell arranged in the frame, wherein
the service providing mobile unit is able to provide a service for supplying hydrogen to the fuel cell from a hydrogen storage tank inserted in the hydrogen storage tank insert part, a service for lending out a hydrogen storage tank inserted in the hydrogen storage tank insert part, a service for returning a used hydrogen storage tank to the hydrogen storage tank insert part, and a service for storing a hydrogen storage tank inserted into the hydrogen storage tank insert part.

In the present invention, various services can be provided for a hydrogen storage tank.

BRIEF DESCRIPTION OF DRAWINGS

FIG. 6 is a view showing one example of a management list.

DESCRIPTION OF EMBODIMENTS

Figure 1:
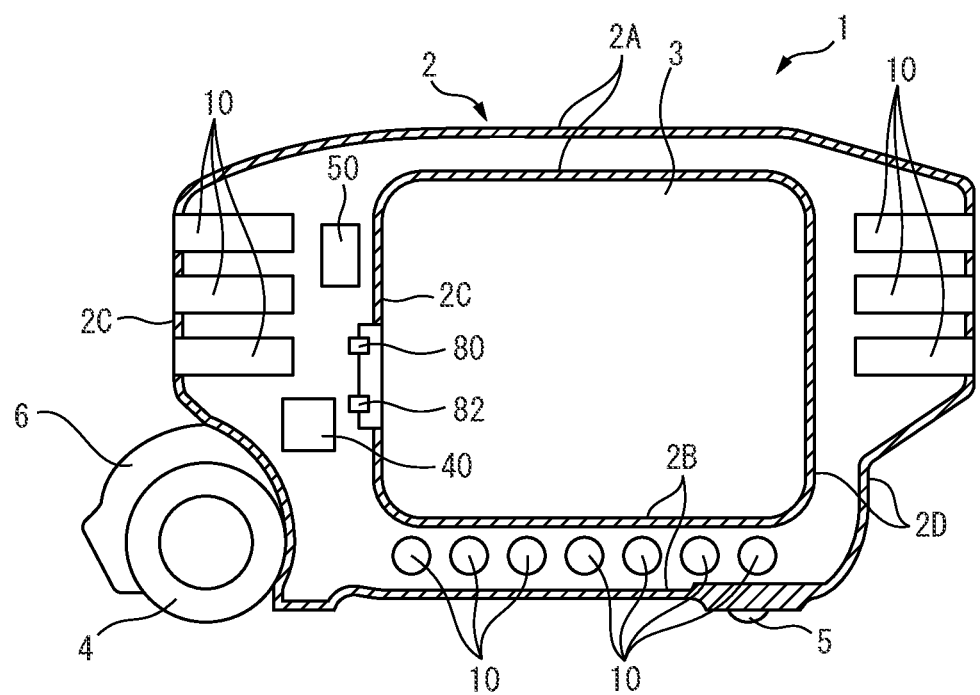
FIG. 1 is a side cross-sectional view schematically illustrating one embodiment of a service providing mobile unit according to the present invention.
Figure 2:
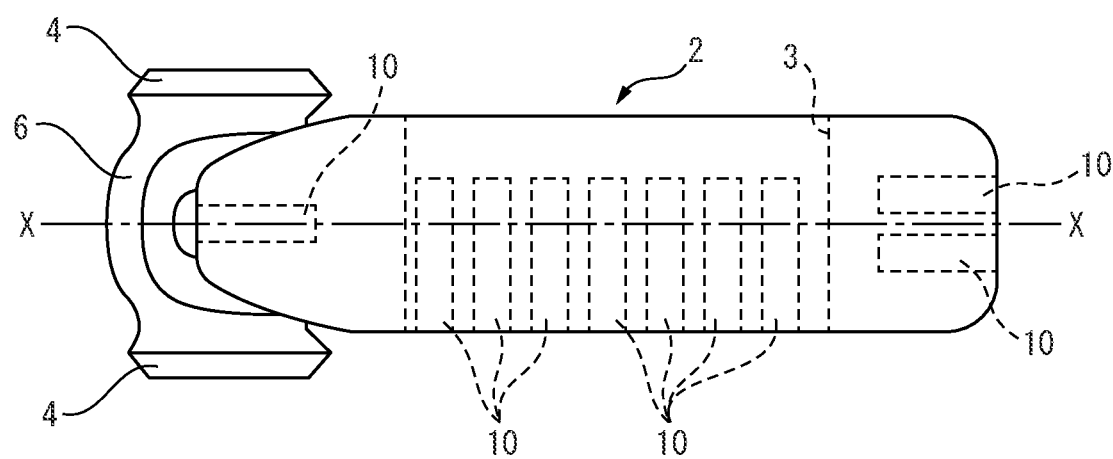
FIG. 2 is a plan view of a service providing mobile unit shown in FIG. 1.

FIG. 1 is a side cross-sectional view schematically illustrating one embodiment of a service providing mobile unit, while FIG. 2 is a plan view of a service providing mobile unit shown in FIG. 1. As will be understood from FIG. 2, the service providing mobile unit 1 has a symmetrical shape about a vertical plane X-X. A horizontal width of the service providing mobile unit 1 (length in direction perpendicular to vertical plane X-X) is formed smaller compared with a horizontal direction length of the service providing mobile unit 1 along the vertical plane X-X and a height of the service providing mobile unit 1.

As shown in FIG. 1, this service providing mobile unit 1 is provided with a frame 2 forming a ring shape about a horizontal axis and movement-use wheels 4 and 5 attached to the bottom part of the frame 2. As shown in FIG. 1 and FIG. 2, the frame 2 is comprised of an upper frame part 2A and lower frame part 2B arranged facing each other and a side frame part 2C and side frame part 2D arranged facing each other. The upper frame part 2A and lower frame part 2B extend in strip shapes with uniform horizontal widths.

As shown in FIG. 1 and FIG. 2, due to these upper frame part 2A, lower frame part 2B, side frame part 2C, and side frame part 2D, a service providing space 3 is formed having the flat inner circumferential surface of the upper frame part 2A, the flat inner circumferential surface of the lower frame part 2B, the flat inner circumferential surface of the side frame part 2C, and the flat inner circumferential surface of the side frame part 2D as its outer edges. In the example shown in FIG. 1 and FIG. 2, this service providing space 3, if viewed from a side surface, is formed to have a substantially square shape.

On the other hand, as shown in FIG. 1 and FIG. 2, a small-sized motor unit 6 having a pair of drive wheels 4 is attached to one end portion of the lower frame part 2B extending in a strip shape, while a plurality of driven wheels 5 are attached to the other end portion of the lower frame part 2B. The service providing mobile unit 1 according to the present invention is made to move forward by this small-sized motor unit 6. This small-sized motor unit 6 can move independently by automated driving and is coupled with one end portion of the lower frame part 2B according to need. FIG. 1 and FIG. 2 show the small-sized motor unit 6 coupled with one end portion of the lower frame part 2B.

This small-sized motor unit 6 communicates with a mobile unit management server for managing the service providing mobile unit 1 through a communication network. Based on commands from the mobile unit management server, the small-sized motor unit 6 is made to move by automated driving until the required service providing mobile unit 1 and is connected to the required service providing mobile unit 1. Next, based on commands from the mobile unit management server, the service providing mobile unit 1 is made to move by the small-sized motor unit 6 to a destination. Next, based on commands from the mobile unit management server, the small-sized motor unit 6 is separated from the service providing mobile unit 1 and made to move by automated driving to the next required service providing mobile unit 1. Note that, this small-sized motor unit 6 can also be configured to be constantly coupled with the service providing mobile unit 1. The configuration of this mobile unit management server will be explained later.

As shown in FIG. 2, the inside of the frame 2 forms a hollow, and a plurality of hydrogen storage tank insert parts 10 are formed inside the frame 2. In the example shown in FIG. 1 and FIG. 2, at the outer circumferential wall of the side frame part 2C, a plurality of hydrogen storage tank insert parts 10 are formed arranged aligned in the vertical direction at distances from each other. At the outer circumferential wall of the side frame part 2D, two rows of hydrogen storage tank insert parts 10 are formed arranged aligned in the vertical direction at distances from each other. Further, at the outer circumferential wall of the lower frame part 2B, a plurality of hydrogen storage tank insert parts 10 are formed arranged aligned at distances from each other. Inside these hydrogen storage tank insert parts 10, replaceable hydrogen storage tanks are inserted.

On the other hand, as shown in FIG. 1, a fuel cell 40 is placed inside the frame 2. This fuel cell 40 is supplied with hydrogen from a hydrogen storage tank inserted in the hydrogen storage tank insert part 10. The fuel cell 40 uses this supplied hydrogen to generate power. This generated power of the fuel cell 40 is used for various purposes. For example, this generated power of the fuel cell 40 is supplied to a service providing unit installed in the service providing space 3. As this service providing unit, for example, product display racks and a vending machine may be considered. Further, this generated power of the fuel cell 40, for example, can be used as a power source when a disaster etc. causes a blackout. In this case, the service providing mobile unit 1 acts as a mobile power generating station.

In this way, in the embodiment of the present invention, the frame 2 forms a ring shape about a horizontal axis, a service providing space 3 is formed by the frame 2 having the inner circumferential surface of the frame 2 as its outer edge, and the service providing unit installed inside the service providing space 3 can be supplied with power by the fuel cell 40. In this case, in the embodiment of the present invention, the frame 2 is comprised of the upper frame part 2A and lower frame part 2B arranged facing each other and extending in strip shapes and a pair of the side frame parts 2C and 2D arranged facing each other. These upper frame part 2A, lower frame part 2B, and side frame parts 2C and 2D form the square shaped service providing space 3. The hydrogen storage tank insert parts 10 are formed at least at one frame part among the side frame parts 2C and 2D and lower frame part 2B. Further, in the embodiment of the present invention, the frame 2 is provided with the lower frame part 2B extending in a strip shape. The small-sized motor unit 6 having a pair of the drive wheels 4 is attached to one end portion of the lower frame part 2B extending in a strip shape, while a plurality of driven wheels 5 are attached to the other end portion of the lower frame part 2B.

Figure 3A:
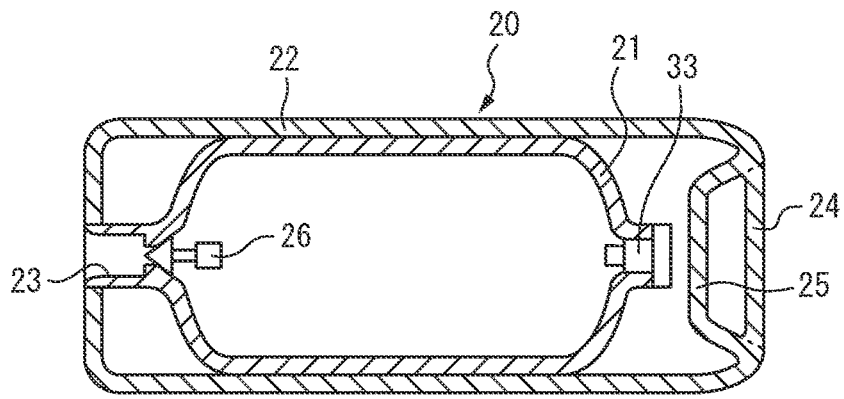
FIG. 3A is a schematically illustrated side cross-sectional view of a hydrogen storage tank.
Figure 3B:
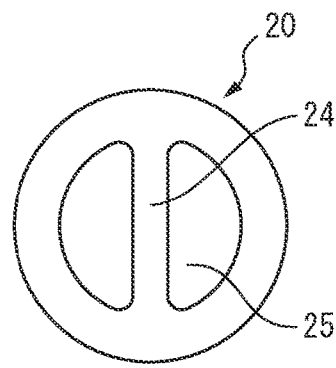
FIG. 3B is a side view of FIG. 3A.

Next, the hydrogen storage tank insert part 10 formed inside the frame 2 and a hydrogen storage tank inserted into the hydrogen storage tank insert part 10 will be explained while referring to FIG. 3A to FIG. 3D. FIG. 3A is a schematically illustrated side cross-sectional view of a hydrogen storage tank 20 inserted into the hydrogen storage tank insert part 10. FIG. 3B is a side view of the hydrogen storage tank 20 when viewing the hydrogen storage tank 20 shown in FIG. 3A from the right direction. Referring to FIG. 3A, the hydrogen storage tank 20 is comprised of a tank body 21 and a cylindrical casing 22 surrounding the tank body 21. In the example shown in FIG. 3A, the inside of the tank body 21 is filled with high pressure hydrogen gas. Note that, a hydrogen storing alloy may also be placed inside the tank body 21.

At one end portion of the tank body 21, that is, one end portion of the hydrogen storage tank 20, a hydrogen outflow part 23 is formed. At the other end portion of the hydrogen storage tank 20, a handle 24 able to be grasped by the hand, that is, a graspable handle 24 is formed. In the example shown in FIG. 3A and FIG. 3B, the two end faces of the cylindrical casing 22, that is, the two end faces of the hydrogen storage tank 20, are formed from flat surfaces. The hydrogen outflow part 23 is formed as a recessed cylindrical groove sunken in from one flat end face of the hydrogen storage tank 20. On the other hand, a recessed groove 25 forming a circular contour shape is formed on the other flat surface of the hydrogen storage tank 20. Inside this recessed groove 25, a handle 24 is formed extending between facing top edge portions of the recessed groove 25 separated by a distance from the bottom portion of the recessed groove 25 so as to be able to be grasped.

Figure 3C:
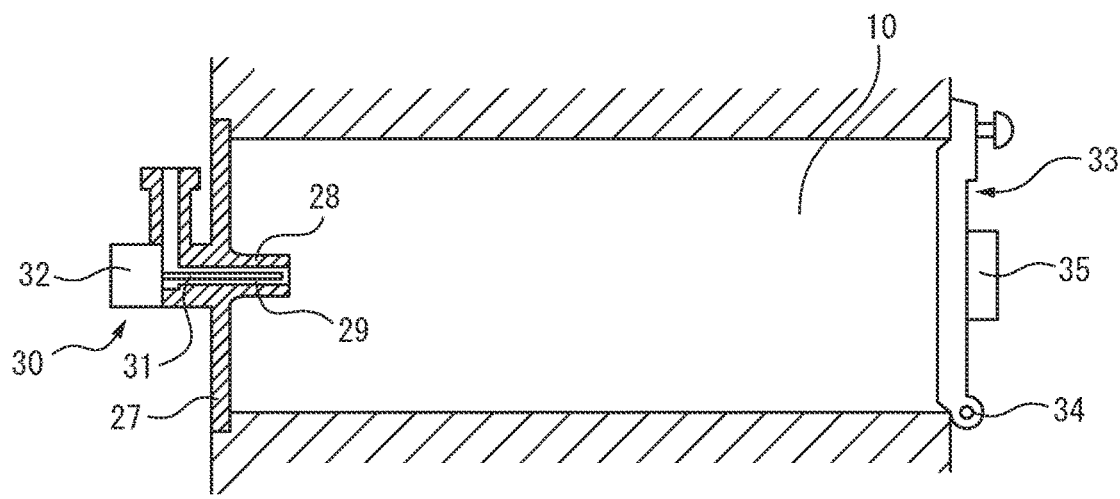
FIG. 3C is a schematically illustrated side cross-sectional view of a hydrogen storage tank insert part.

Further, in FIG. 3A, a normally closed type outflow control valve 26 which is placed inside the tank body 21 for controlling the outflow of hydrogen from the hydrogen outflow part 23 is schematically shown. The outflow control valve 26 usually closes the hydrogen outflow part 23 by a pressure of compressed hydrogen inside of the tank body 21. On the other hand, FIG. 3C shows an enlarged side cross-sectional view of the hydrogen storage tank insert part 10. Referring to FIG. 3C, the deep portion of the hydrogen storage tank insert part 10 is formed with a projecting hydrogen inflow part 28 sticking out to the inside of the hydrogen storage tank insert part 10 from an end wall 27 covering one end portion of the hydrogen storage tank insert part 10. Inside of this projecting hydrogen inflow part 28, a hydrogen inflow passage 29 connected to the fuel cell 40 is formed. Further, an opening/closing lid 33 able to close the open end portion of the hydrogen storage tank insert part 10 is attached to the open end portion of the hydrogen storage tank insert part 10.

Figure 3D:
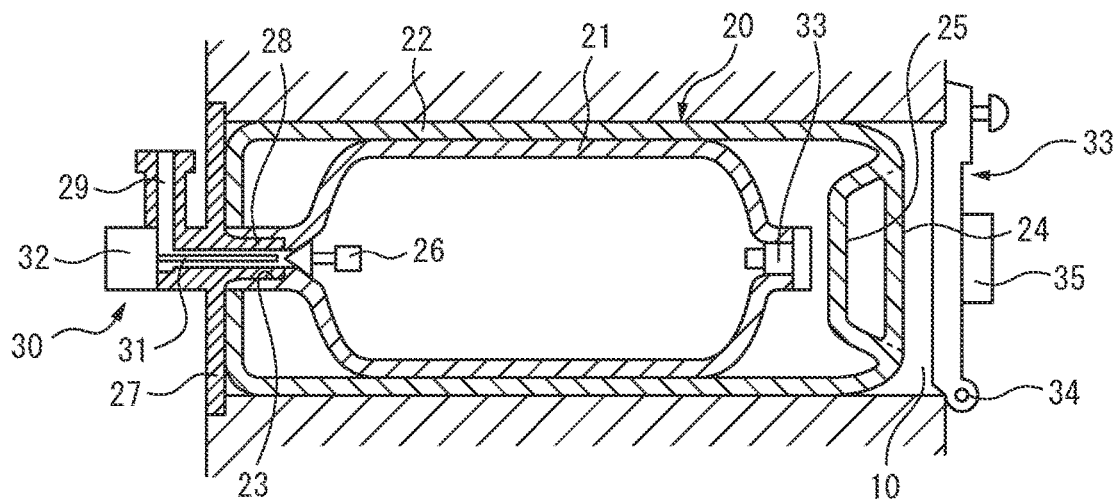
FIG. 3D is a view showing when a hydrogen storage tank is inserted into a hydrogen storage tank insert part.

On the other hand, FIG. 3D shows when the hydrogen storage tank 20 is inserted into the hydrogen storage tank insert part 10. The work of inserting the hydrogen storage tank 20 into the hydrogen storage tank insert part 10 is performed by gripping the handle 24 by the hand, opening the lid 33, inserting the end portion of the hydrogen storage tank 20 at which the hydrogen outflow part 23 is formed into the hydrogen storage tank insert part 10, and pushing the hydrogen storage tank 20 inside the hydrogen storage tank insert part 10. If the hydrogen storage tank 20 is pushed inside of the hydrogen storage tank insert part 10, the recessed hydrogen outflow part 23 is fitted onto the projecting hydrogen inflow part 28. Explaining this from a structural viewpoint, around the hydrogen storage tank insert part 10, a guide wall is formed for guiding the recessed hydrogen outflow part 23 of the hydrogen storage tank 20 to the projecting hydrogen inflow part 28 when inserting the hydrogen storage tank 20 into the hydrogen storage tank insert part 10. When the hydrogen storage tank 20 is inserted into the hydrogen storage tank insert part 10, the recessed hydrogen outflow part 23 of the hydrogen storage tank 20 is guided by this guide wall to the projecting hydrogen inflow part 28 so as to be fitted onto the projecting hydrogen inflow part 28.

In this case, this guide wall acts to hold the hydrogen storage tank 20 in a state where the recessed hydrogen outflow part 23 is fitted onto the projecting hydrogen inflow part 28. In the example shown in FIG. 3C and FIG. 3D, this guide wall is formed from the cylindrical wall. In this case, this guide wall does not necessarily have to be formed from the cylindrical wall. As this guide wall, for example, in FIG. 3D, a guide rod extending in the longitudinal direction of the hydrogen storage tank insert part 10 along the circumference of the hydrogen storage tank 20 or a guide rod with a guide roller can be used.

On the other hand, the recessed hydrogen outflow part 23 and the projecting hydrogen inflow part 28 have a coupling structure whereby the recessed hydrogen outflow part 23 is coupled with the projecting hydrogen inflow part 28 when the recessed hydrogen outflow part 23 is made to rotate about the long center axis of the hydrogen storage tank 20 after the recessed hydrogen outflow part 23 is fitted onto the projecting hydrogen inflow part 28 as shown in FIG. 3D. As this coupling structure, for example, the inner circumferential surface of the recessed hydrogen outflow part 23 and the outer circumferential surface of the projecting hydrogen inflow part 28 are respectively made screw structures forming screw threads. Therefore, in the example shown in FIG. 3C and FIG. 3D, after the hydrogen storage tank 20 is inserted inside of the hydrogen storage tank insert part 10 and the recessed hydrogen outflow part 23 is fitted onto the projecting hydrogen inflow part 28, by rotating the handle 24 gripped by the hand about the longitudinal center axis of the hydrogen storage tank 20, the recessed hydrogen outflow part 23 is coupled with the projecting hydrogen inflow part 28.

On the other hand, when replacing the hydrogen storage tank 20, the handle 24 is gripped by the hand and the hydrogen storage tank 20 is made to rotate so as to uncouple the recessed hydrogen outflow part 23 and the projecting hydrogen inflow part 28, then the hydrogen storage tank 20 is pulled out from the hydrogen storage tank insert part 10. Then, a new hydrogen storage tank 20 is inserted into the hydrogen storage tank insert part 10. The pulled out hydrogen storage tank 20 is filled by a hydrogen filling apparatus with new hydrogen from the hydrogen outflow part 23.

In this way, the work of inserting the hydrogen storage tank 20 inside of the hydrogen storage tank insert part 10 and the work of coupling the recessed hydrogen outflow part 23 and the projecting hydrogen inflow part 28 can be performed by gripping the handle 24, so the work of setting the hydrogen storage tank 20 to the hydrogen storage tank insert part 10 and the work of detaching the hydrogen storage tank 20, that is, the work of replacing the hydrogen storage tank 20 can be easily performed. Further, by gripping the handle 24 by the hand, the hydrogen storage tank 20 can be easily transported. Further, since the two end faces of the hydrogen storage tank 20 are formed from flat surfaces, the hydrogen storage tank 20 can be placed standing on the floor and, further, hydrogen storage tanks 20 can be easily stacked in a standing state. Therefore, the hydrogen storage tanks 20 are easily stored.

On the other hand, as shown in FIG. 3C and FIG. 3D, one end portion 34 of the opening/closing lid 33 is coupled in a rotatable manner with the periphery of the open end portion of the hydrogen storage tank insert part 10, for example, the frame 2. This opening/closing lid 33 is provided with an electronic locking device 35 having a communication function. This electronic locking device 35 is used for the work of locking and the work of unlocking the opening/closing lid 33.

As explained above, in the embodiment of the present invention, the hydrogen inflow parts 28 connected to the fuel cell 40 are formed at the deep portions of the hydrogen storage tank insert parts 10. The hydrogen outflow parts 23 which are coupled with the hydrogen inflow parts 28 when the hydrogen storage tanks 20 are inserted into the hydrogen storage tank insert parts 10 are formed at one end portions of the hydrogen storage tanks 20 while the handles 24 able to be gripped are formed at the other end portions of the hydrogen storage tanks 20. The work of inserting the hydrogen storage tanks 20 inside of the hydrogen storage tank insert parts 10 and the work of coupling the hydrogen inflow parts 28 and the hydrogen outflow parts 23 are performed by gripping the handles 24. In this case, in the embodiment of the present invention, the work of coupling the hydrogen inflow parts 28 and the hydrogen outflow parts 23 is performed by gripping the handles 24 and rotating the hydrogen storage tanks 20.

Further, in the embodiment of the present invention, the hydrogen inflow part 28 is formed in a projecting shape and the hydrogen outflow part 23 is formed in a recessed shape, and the hydrogen inflow part 28 is coupled with the hydrogen outflow part 23 by fitting the recessed hydrogen outflow part 23 of the hydrogen storage tank 20 onto the projecting hydrogen inflow part 28. In this case, this recessed hydrogen outflow part 23 and the projecting hydrogen inflow part 28 have a coupling structure whereby the recessed hydrogen outflow part 23 is coupled with the projecting hydrogen inflow part 28 when the recessed hydrogen outflow part 23 is made to rotate after the recessed hydrogen outflow part 23 is fitted onto the projecting hydrogen inflow part 28. The coupling structure is comprised of a screw structure. Further, in the embodiment of the present invention, a guide wall for guiding the recessed hydrogen outflow part 23 of the hydrogen storage tank 20 to the projecting hydrogen inflow part 28 when inserting the hydrogen storage tank 20 into the hydrogen storage tank insert part 10 is formed at the hydrogen storage tank insert part 10. The guide wall forms a cylindrical shape. Further, in the embodiment of the present invention, the two end faces of the hydrogen storage tank 20 are formed from flat surfaces.

On the other hand, valve opening control devices 30 for controlling the opening of the normally closed type outflow control valves 26 are arranged at the projecting hydrogen inflow parts 28. FIG. 3C and FIG. 3D schematically show this valve opening control device 30. In the example of FIG. 3C and FIG. 3D, this valve opening control device 30 is comprised of a control rod 31 able to engage with the outflow control valve 26 and an actuator 32 comprised of, for example, a solenoid, for driving the control rod 31. If the solenoid is energized, the control rod 31 abuts against the outflow control valve 26 to push up the outflow control valve 26. As a result, the outflow control valve 26 opens and high pressure stored hydrogen inside the tank body 21 flows to the inside of the hydrogen inflow passage 29 of the hydrogen inflow part 28. If the solenoid is deenergized, the outflow control valve 26 closes and the outflow of stored hydrogen from the tank body 21 stops.

Further, as shown in FIG. 3A and FIG. 3D, a sensor 33 for detecting the state of stored hydrogen inside the hydrogen storage tank 20 is arranged at the end portion of the tank body 21 at the opposite side to the hydrogen outflow part 23, that is, the end portion side of the hydrogen storage tank 20 at the opposite side from the hydrogen outflow part 23. This sensor 33 is comprised of a sensor for detecting at least one of the pressure and temperature. In the example shown in FIG. 3A and FIG. 3D, the sensor 33 has a built-in transmission device for transmitting the detection signal to the outside. In this case, the detection signal of the sensor 33 can also be transmitted to the outside through a signal wire.

In this way, in the embodiment of the present invention, the normally closed type outflow control valve 26 for controlling an outflow of hydrogen from the hydrogen storage tank 20 is arranged at the hydrogen outflow part 23, and the valve opening control device 30 for controlling opening of the outflow control valve 26 is arranged at the hydrogen inflow part 28. Further, in the embodiment of the present invention, a sensor 33 for detecting a state of stored hydrogen inside the hydrogen storage tank 20 is arranged at the end portion side of the hydrogen storage tank 20 at the opposite side to the hydrogen outflow part 23.

Figure 4:
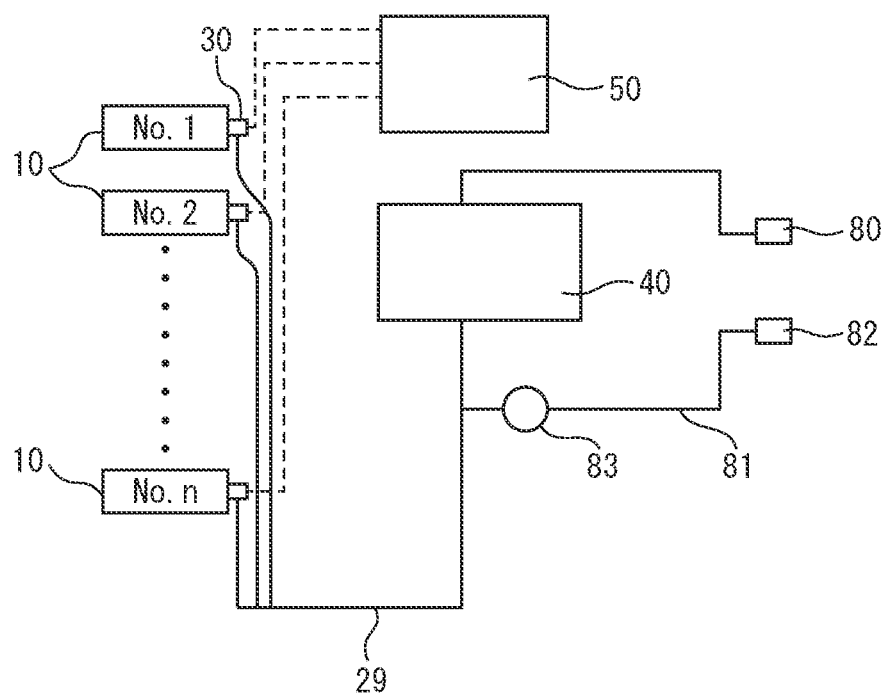
FIG. 4 is a view showing a hydrogen supply control device.

FIG. 4 shows an overall view of a hydrogen supply control device for controlling the supply of hydrogen to the fuel cell 40. This FIG. 4 schematically illustrates all of the hydrogen storage tank insert parts 10 formed in the frame 2 in FIG. 1 and FIG. 2. In the example shown in FIG. 4, for convenience in explanation, the hydrogen storage tank insert parts 10 are assigned the references No. 1, No. 2, . . . No. "n".

Figure 5:
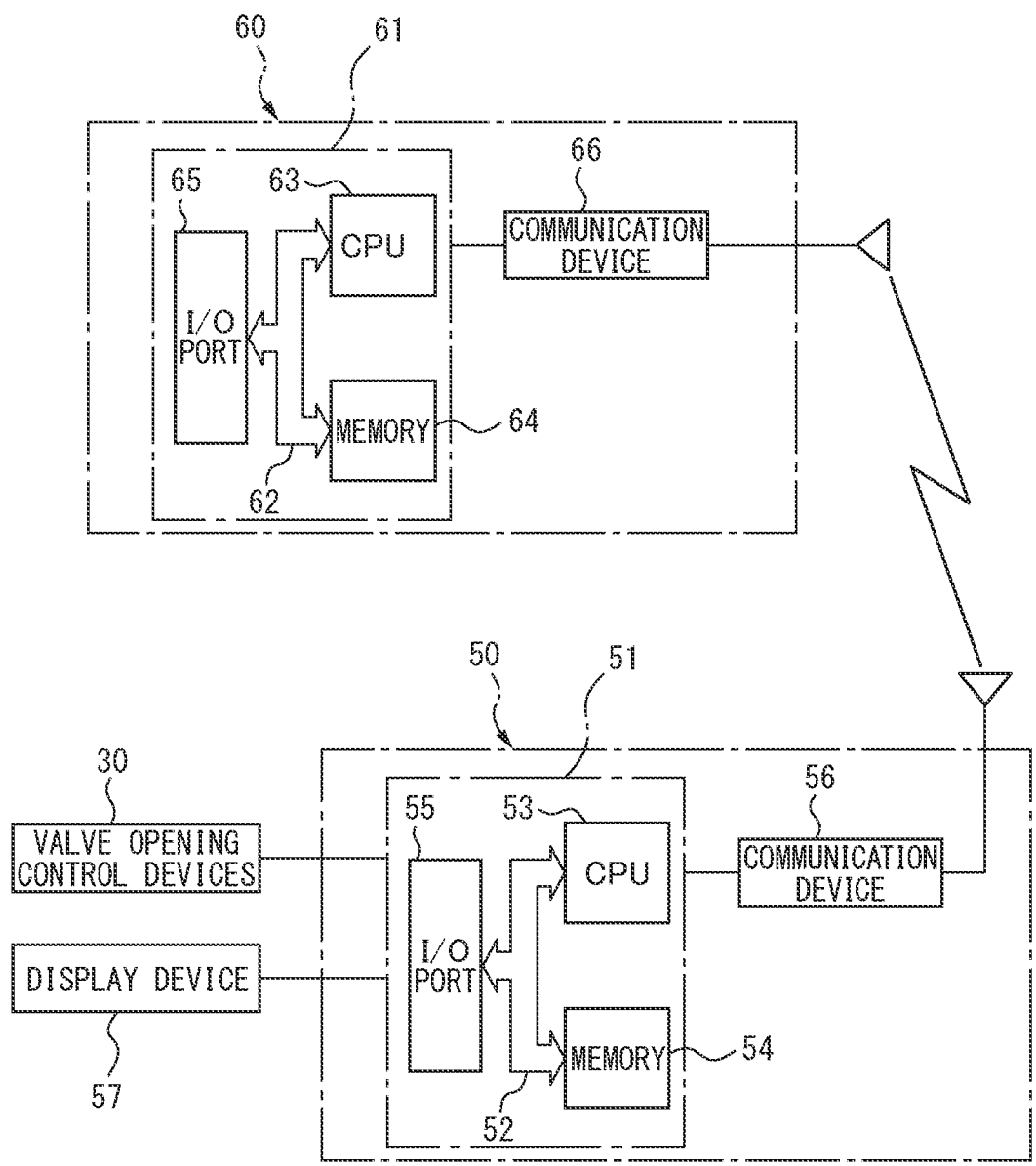
FIG. 5 is a view showing an electronic control device and mobile unit management server.

As shown in FIG. 4, all of the hydrogen storage tanks 20 are connected to the fuel cell 40 through the hydrogen inflow passage 29 shown by the solid line. The valve opening control devices 30 provided at the hydrogen storage tank insert parts 10, as shown by the broken lines, are connected to an electronic control device 50. This electronic control device 50, as shown in FIG. 1, is arranged inside the frame 2. FIG. 5 shows the electronic control device 50. As shown in FIG. 5, this electronic control device 50 is provided with an electronic control unit 51. This electronic control unit 51 is comprised of a digital computer provided with a CPU (microprocessor) 53, a memory 54 comprised of a ROM and RAM, and an input/output port 55, which are connected with each other by a bidirectional bus 52.

Further, the electronic control device 50 is provided with a communication device 56. This communication device 56 is connected to the electronic control unit 51. The detection signals emitted from the sensors 33 of the hydrogen storage tanks 20 are input through the communication device 56 to the electronic control unit 51. Further, as shown in FIG. 5, the valve opening control devices 30 are connected to the electronic control unit 51, and opening of the outflow control valves 26 is controlled by the valve opening control devices 30 based on the output signals of the electronic control unit 51. Further, a display device 57 having a display screen is connected to the electronic control unit 51. The display on the display screen of the display device 57 is controlled based on the output signals of the electronic control unit 51.

In the embodiment of the present invention, hydrogen is supplied to the fuel cell 40 from any one of the hydrogen storage tanks 20. If the remaining amount of hydrogen in the hydrogen storage tank 20 becomes small, hydrogen starts to be supplied to the fuel cell 40 from a new hydrogen storage tank 20, and hydrogen stops being supplied to the fuel cell 40 from the hydrogen storage tank 20 which had been used up to then. Therefore, it becomes possible to continue the supply of hydrogen to the fuel cell 40 without stopping. Therefore, the fuel cell 40 can continuously produce output. Therefore, for example, when a disaster or the like causes a blackout to occur, if using the service providing mobile unit 1 as a mobile power generating station, it is possible to continue generating power by just continuing to replace the hydrogen storage tank 20. Therefore, there can be said to be great meaning in constantly stationing the service providing mobile unit 1 and a large number of the hydrogen storage tanks 20 at each region.

On the other hand, in the embodiment of the present invention, extraction and insertion of the hydrogen storage tank 20 from and to the hydrogen storage tank insert part 10 are managed by a mobile unit management server. FIG. 5 also shows this mobile unit management server 60. As shown in FIG. 5, inside of this mobile unit management server 60, an electronic control unit 61 is provided. This electronic control unit 61 is comprised of a digital computer and is provided with a CPU (microprocessor) 63, a memory 64 comprised of a ROM and RAM, and an input/output port 65, which are connected with each other by a bidirectional bus 62. Further, in the mobile unit management server 60, a communication device 66 is provided. The communication device 56 of the electronic control device 50 can communicate through a communication network with the communication device 66 of the mobile unit management server 60.

FIG. 6 shows one example of a management list which is managed by the mobile unit management server 60. Referring to FIG. 6, this management list lists the mobile unit Nos. "k" (=1, 2, 3 . . . ) assigned to the service providing mobile units 1, the insert part Nos. 1, 2, 3 . . . "n" assigned to the hydrogen storage tank insert parts 10 formed at the service providing mobile units 1, the states of use of the hydrogen storage tank insert parts 10, the purposes of use of the hydrogen storage tank insert parts 10, the tank IDs assigned to the hydrogen storage tanks 20 for identifying the hydrogen storage tanks 20, the user IDs assigned to the users utilizing the hydrogen storage tank insert parts 10 for identifying the users, and the remaining amounts of hydrogen in the hydrogen storage tanks 20 inserted into the hydrogen storage tank insert parts 10. This management list is stored in the memory 64 of the mobile unit management server 60.

In this case, the state of use of the hydrogen storage tank insert part 10 is judged at the electronic control device 50 set at each service providing mobile unit 1. For example, a sensor reacting when the hydrogen storage tank 20 is inserted into the hydrogen storage tank insert part 10 or a sensor reacting when the recessed hydrogen outflow part 23 of the hydrogen storage tank 20 is fitted onto the projecting hydrogen inflow part 28 of the hydrogen storage tank insert part 10 is set at the hydrogen storage tank insert part 10. From the output signal of this sensor, the electronic control device 50 judges if the hydrogen storage tank insert part 10 is in use or if the hydrogen storage tank insert part 10 is empty. The result of this judgment is sent from the electronic control device 50 to the mobile unit management server 60 and is stored in the column of the "state of use" of the hydrogen storage tank insert parts 10 shown in FIG. 6.

On the other hand, in the embodiment of the present invention, the detection signal of the sensor 33 placed in the hydrogen storage tank 20 is sent together with the tank ID to the electronic control device 50. In this case, in the embodiment of the present invention, the pressure P of the stored hydrogen in the hydrogen storage tank 20 is detected by the sensor 33, and the remaining amount of hydrogen in the hydrogen storage tank 20 is calculated from this detected pressure P in the electronic control device 50. This calculated remaining amount of hydrogen is sent together with the insert part No. showing the location of insertion of the hydrogen storage tank 20 and the tank ID from the electronic control device 50 to the mobile unit management server 60. These tank ID and remaining amount of hydrogen are respectively stored in the column of the "tank ID" corresponding to the insert part No. and the column of the "remaining amount of hydrogen" corresponding to the insert part No. in FIG. 6.

Further, as explained above, in the embodiment of the present invention, hydrogen is supplied from any one hydrogen storage tank 20 to the fuel cell 40, and the insert part No. showing the location of insertion of the hydrogen storage tank 20 in the middle of supplying hydrogen to the fuel cell 40 is sent together with the tank ID from the electronic control device 50 to the mobile unit management server 60. Therefore, at the mobile unit management server 60 side, it becomes possible to identify the hydrogen storage tank 20 in the middle of supplying hydrogen to the fuel cell 40. Further, in the embodiment of the present invention, in the electronic control device 50, it is judged if the remaining amount of hydrogen of the hydrogen storage tank 20 in the middle of supplying hydrogen to the fuel cell 40 has become small, that is, if the hydrogen storage tank 20 should be replaced. If it is judged that the hydrogen storage tank 20 should be replaced, a display to the effect that the hydrogen storage tank 20 should be replaced, for example, a display that "Required replacement of tank" is shown at the display screen of the display device 57. Further, in this case, the fact that the hydrogen storage tank 20 should be replaced is sent from the electronic control device 50 to the mobile unit management server 60 and the display that tank should be replaced is stored in the corresponding column of the management list shown in FIG. 6. In this case, the replacement of the hydrogen storage tank 20 is performed by, for example, the manager of the service providing mobile unit 1 viewing the display screen of the display device 57 or receiving a message from the mobile unit management server 60.

On the other hand, this hydrogen storage tank 20 has great general applicability and can be used as various hydrogen storage tanks such as a replaceable hydrogen storage tank for a vehicle driven by a fuel cell, a replaceable hydrogen storage tank for an electric scooter driven by a fuel cell, a replaceable hydrogen storage tank for a cooking apparatus using a flame of combustion of hydrogen, or a replaceable hydrogen storage tank for a heating device using a flame of combustion of hydrogen. In this case, in the embodiment of the present invention, to enable the hydrogen storage tank 20 inserted in the hydrogen storage tank insert part 10 to be used for various purposes, a service is provided for lending out the hydrogen storage tank 20 inserted in the hydrogen storage tank insert part 10 to a user of the hydrogen storage tank 20 desiring use.

Figure 7A:
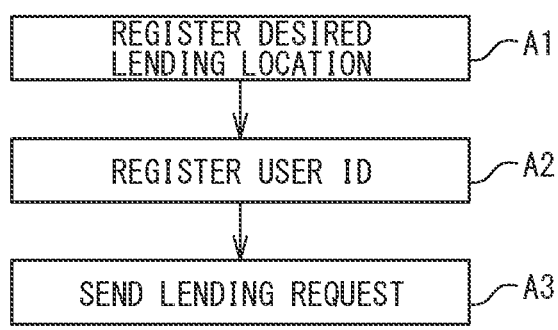
FIG. 7A and FIG. 7B are respectively views showing a routine when requesting lending of a hydrogen storage tank and a routine when permitting lending of a requested hydrogen storage tank.
Figure 7B:
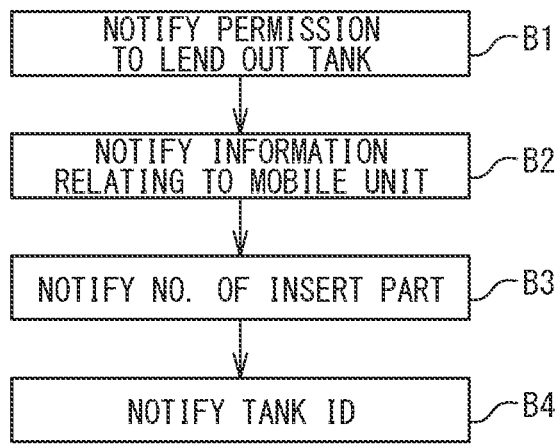

FIG. 7A shows one example of a routine when a user of the hydrogen storage tank 20 desiring use requests loan of the hydrogen storage tank 20, while FIG. 7B shows one example of a routine when permitting loan of the hydrogen storage tank 20. When requesting loan of the hydrogen storage tank 20, the user of the hydrogen storage tank 20, for example, registers the desired lending location of the hydrogen storage tank 20 on the screen for requesting loan of the hydrogen storage tank 20 of a mobile terminal such as shown at A1 of FIG. 7A, then, as shown at A2 of FIG. 7A, registers the user ID for identifying the user of the hydrogen storage tank 20. Next, as shown at A3 of FIG. 7A, the user sends these registered data and the request for loan of the hydrogen storage tank 20 from the mobile terminal to the mobile unit management server 60.

If the mobile unit management server 60 receives a request for loan of the hydrogen storage tank 20, in the mobile unit management server 60, it is judged whether to permit loan of the hydrogen storage tank 20. In this case, for example, in the mobile unit management server 60, it is continuously judged for all of the hydrogen storage tanks 20 of each service providing mobile unit 1 whether the hydrogen storage tank 20 can be lent out based on the state of supply of hydrogen to the fuel cell 40 and the remaining amount of hydrogen, and the result of this judgment, as shown in FIG. 6, is stored in the corresponding column of the management list. Therefore, if the mobile unit management server 60 receives a request for loan of the hydrogen storage tank 20, in the mobile unit management server 60, it is judged whether there is the hydrogen storage tank 20 able to be lent out from the management list for the service providing mobile unit 1 positioned at the registered desired lending location of the hydrogen storage tank 20 or nearby it. If there is the hydrogen storage tank 20 able to be lent out, the hydrogen storage tank 20 able to be lent out is determined and notifications shown in B1 to B4 of FIG. 7B are sent from the mobile unit management server 60 to the mobile terminal.

That is, the corresponding mobile terminal, as shown at B1 of FIG. 7B, is notified of the effect that loan of the hydrogen storage tank 20 is permitted. Next, as shown at B2 of FIG. 7B, the position of the service providing mobile unit 1 receiving the hydrogen storage tank 20 and the No. of the service providing mobile unit 1 etc. are notified. Next, as shown at B3 of FIG. 7B, the No. of the hydrogen storage tank insert part 10 in which the received hydrogen storage tank 20 is inserted is notified. Next, as shown at B4 of FIG. 7B, the tank ID identifying the received hydrogen storage tank 20 is notified. If receiving these notifications, it becomes possible to perform the work of unlocking the opening/closing lid 33 by making to read the notified tank ID and user ID in the electronic locking device 35 provided at the opening/closing lid 33 of the notified hydrogen storage tank insert part 10, and thereby the hydrogen storage tank 20 can be received.

On the other hand, when consuming the hydrogen in the hydrogen storage tank 20 after receiving the hydrogen storage tank 20 utilizing the service for lending out the hydrogen storage tank 20, the hydrogen storage tank 20 has to be returned. In this case, in the embodiment of the present invention, the service providing mobile unit 1 provides the user of the hydrogen storage tank 20 desiring to return the used hydrogen storage tank 20 with a service for return of the used hydrogen storage tank 20.

Figure 8A:
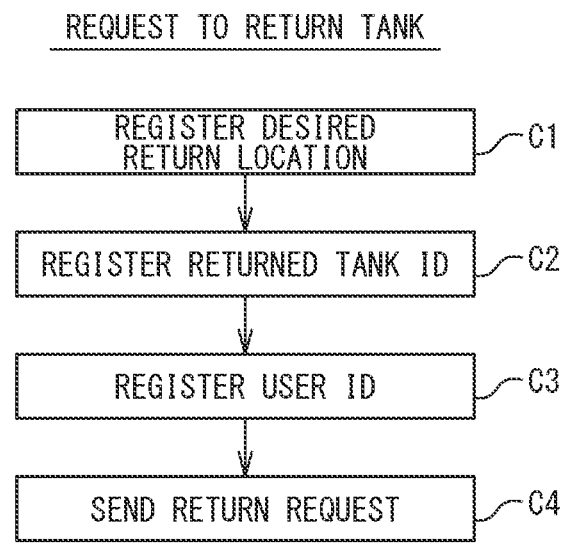
FIG. 8A and FIG. 8B are respectively views showing a routine when requesting return of a used hydrogen storage tank and a routine when permitting return of a used hydrogen storage tank.
Figure 8B:
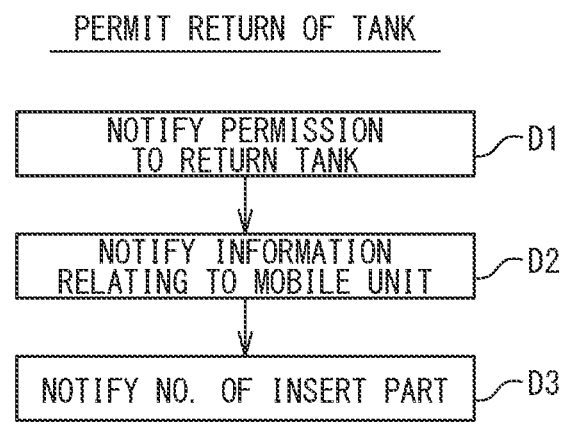

FIG. 8A shows one example of the routine when a user of the hydrogen storage tank 20 requests to return a used hydrogen storage tank 20, while FIG. 8B shows on example of the routine when permitting the return of the used hydrogen storage tank 20. When requesting to return a used hydrogen storage tank 20, the user of the hydrogen storage tank 20, for example, as shown at C1 of FIG. 8A, registers the desired return location of the used hydrogen storage tank 20 on the return request screen of the hydrogen storage tank 20 of the mobile terminal, then, as shown at C2 of FIG. 8A, registers the return tank ID for identifying the used hydrogen storage tank 20, then, as shown at C3 of FIG. 8A, registers the user ID for identifying the user of the hydrogen storage tank 20. Next, as shown at C4 of FIG. 8A, the user sends these registered data and the request to return the used hydrogen storage tank 20 from the mobile terminal to the mobile unit management server 60.

If the mobile unit management server 60 receives a request to return the used hydrogen storage tank 20, in the mobile unit management server 60, it is judged whether to permit the return of the used hydrogen storage tank 20. In this case, if receiving a request to return a used hydrogen storage tank 20, in the mobile unit management server 60, it is judged from the management list if there is the hydrogen storage tank insert part 10 in the empty state for the service providing mobile unit 1 positioned at the desired return location of the registered used hydrogen storage tank 20 or near it. If there is a hydrogen storage tank insert part 10 in the empty state, the available empty hydrogen storage tank insert part 10 is determined and notifications shown from D1 to D3 of FIG. 8B are sent from the mobile unit management server 60 to the mobile terminal.

That is, the corresponding mobile terminal, as shown at D1 of FIG. 8B, is notified to the effect that return of the used hydrogen storage tank 20 is permitted, then, as shown at D2 of FIG. 8B, the position of the service providing mobile unit 1 for return of the used hydrogen storage tank 20, the No. of the service providing mobile unit 1, etc. are notified, then, as shown at D3 of FIG. 8B, the No. of the empty hydrogen storage tank insert part 10 for insertion of the used hydrogen storage tank 20 is notified. If receiving these, it becomes possible to perform the work of unlocking the opening/closing lid 33 by making to read the return tank ID and user ID in the electronic locking device 35 provided at the opening/closing, lid 33 of the notified hydrogen storage tank insert part 10, and thereby the hydrogen storage tank 20 can be inserted inside the hydrogen storage tank insert part 10.

Further, the service providing mobile unit 1 also offers the user of the hydrogen storage tank 20 the service of storing the hydrogen storage tank 20 in an empty hydrogen storage tank insert part 10. The routine when requesting storage of the hydrogen storage tank 20 is similar to the routine when requesting return of the hydrogen storage tank 20 shown in FIG. 8A. The routine when permitting storage of the hydrogen storage tank 20 is also similar to the routine when permitting return of the hydrogen storage tank 20 shown in FIG. 8B. Therefore, explanations of the routine when requesting storage of the hydrogen storage tank 20 and the routine when permitting storage of the hydrogen storage tank 20 will be omitted.

In this way, in the embodiment of the present invention, the service providing mobile unit 1 comprises the frame 2, the movement use wheels 4 and 5 attached to the bottom part of the frame 2, a plurality of the hydrogen storage tank insert parts 10 formed at the frame 2, and the fuel cell 40 arranged inside the frame 2, and a service for supplying hydrogen from the hydrogen storage tank 20 inserted into the hydrogen storage tank insert part 10 to the fuel cell 40, a service for lending out the hydrogen storage tank 20 inserted into the hydrogen storage tank insert part 10, a service for returning a used hydrogen storage tank 20 to the hydrogen storage tank insert part 10, and a service for storing the hydrogen storage tank 20 inserted into the hydrogen storage tank insert part 10 can be provided.

Further, in the embodiment of the present invention, the remaining amount of hydrogen inside the hydrogen storage tank 20 inserted into the hydrogen storage tank insert part 10 is detected, and a service for supplying hydrogen from the hydrogen storage tank 20 to the fuel cell 40 and a service for lending out the hydrogen storage tank 20 are performed based on the detected remaining amount of hydrogen inside the hydrogen storage tank 20. In this case, in the embodiment of the present invention, when there is a request for lending out the hydrogen storage tank 20 inserted into the hydrogen storage tank insert part 10, the hydrogen storage tank 20 able to be lent out is determined based on the detected remaining amount of hydrogen in the hydrogen storage tank 20.

On the other hand, in the embodiment of the present invention, the state of use of the hydrogen storage tank insert part 10 is stored in the storage device, and a service for returning the hydrogen storage tank 20 and a service for storing the hydrogen storage tank 20 are performed based on the state of use of the hydrogen storage tank insert part 10 stored in the storage device. In this case, in the embodiment of the present invention, when there is a request for return of a used hydrogen storage tank 20 to the hydrogen storage tank insert part 10, the hydrogen storage tank insert part 10 enabling insertion of the used hydrogen storage tank 20 is determined based on the state of use of the hydrogen storage tank insert part 10 stored in the storage device.

Further, in the embodiment of the present invention, a storage device is provided at the electronic control unit 61 of the management server 60. The remaining amount of hydrogen in the hydrogen storage tank 20 inserted into the hydrogen storage tank insert part 10 is detected and the detected remaining amount of hydrogen is stored in this storage device. A communication device 56 for communicating with the management server 60 is provided, and by communicating with the management server 60 by this communication device 56, a service for supplying hydrogen from the hydrogen storage tank 20 to the fuel cell 40, a service for lending out the hydrogen storage tank 20, a service for returning the hydrogen storage tank 20, and a service for storing the hydrogen storage tank 20 are provided.

Figure 9:
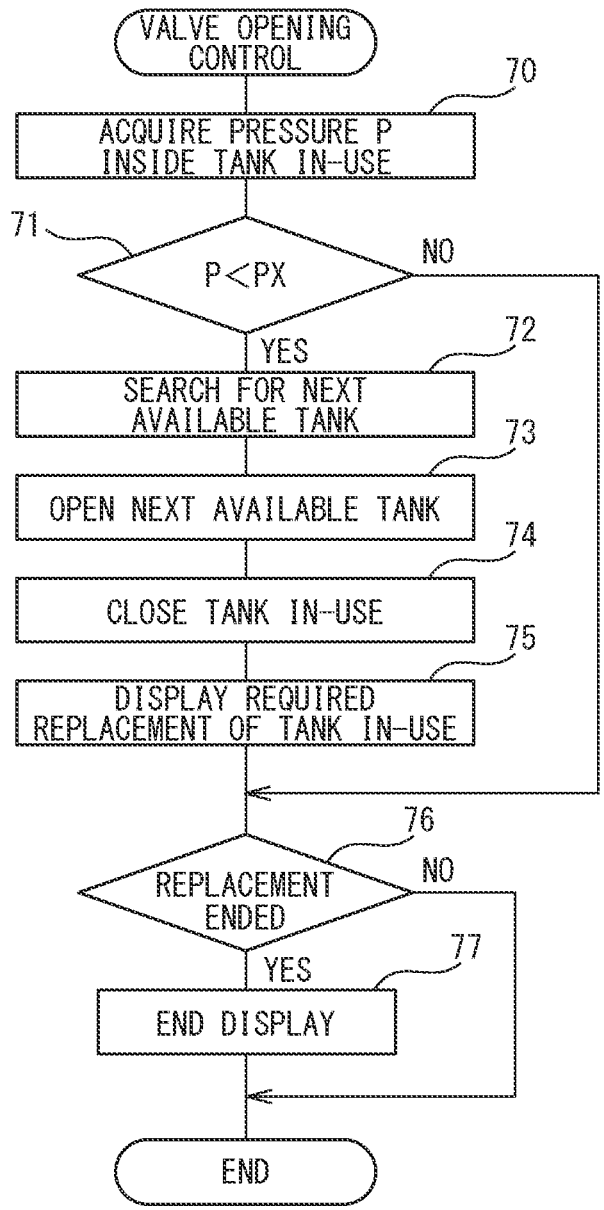
FIG. 9 is a flow chart for valve opening control.

On the other hand, as explained above, in the embodiment of the present invention, hydrogen is supplied from any one hydrogen storage tank 20 to the fuel cell 40. If the remaining amount of hydrogen in the hydrogen storage tank 20 becomes small, hydrogen starts to be supplied from a new hydrogen storage tank 20 to the fuel cell 40 and hydrogen stops being supplied to the fuel cell 40 from the hydrogen storage tank 20 which had been used up to then. FIG. 9 shows a valve opening control routine of the normally closed type outflow control valve 26 for supplying hydrogen to the fuel cell 40. This routine is repeatedly performed at the electronic control unit 51 of the electronic control device 50.

Referring to FIG. 9, first, at step 70, the pressure P of the stored hydrogen inside the hydrogen storage tank 20 in use detected by the sensor 33 of the hydrogen storage tank 20 in use is acquired. In the example shown in FIG. 9, this pressure P is used as the value for estimating the remaining amount of hydrogen in the hydrogen storage tank 20. Next, at step 71, it is judged if the pressure P of the stored hydrogen inside the hydrogen storage tank 20 in use falls below a set pressure PX showing the allowable limit value of the remaining amount of hydrogen, that is, if the estimated remaining amount of hydrogen of the hydrogen storage tank 20 falls below a set amount of hydrogen. When it is judged that the pressure P of the stored hydrogen inside the hydrogen storage tank 20 in use does not fall below the set pressure PX, the routine jumps to step 76. As opposed to this, when at step 71 it is judged that the pressure P of the stored hydrogen inside the hydrogen storage tank 20 in use falls below the set pressure PX, the routine proceeds to step 72.

At step 72, for example, the next available hydrogen storage tank 20 is searched based on the remaining amounts of hydrogen in the hydrogen storage tanks 20 stored in the memory 54 of the electronic control unit 51. Next, at step 73, the outflow control valve 26 of the found next available hydrogen storage tank 20 is made to open, then at step 74, the outflow control valve 26 of the currently used hydrogen storage tank 20 is made to close. Next, at step 75, a display to the effect that the currently used hydrogen storage tank 20 should be replaced, for example, a display that "Required replacement of tank" is shown on the display screen of the display device 57. Further, in this case, the fact that the hydrogen storage tank 20 in use should be replaced is sent to the mobile unit management server 60. Next, the routine proceeds to step 76. At step 76, it is judged if the hydrogen storage tank 20 has been replaced. When it is judged that the hydrogen storage tank 20 has been replaced, the routine proceeds to step 77 where the display to the effect that the hydrogen storage tank 20 should be replaced is ended. In this way, the outflow control valve 26 in the hydrogen storage tank 20 in use and the outflow control valve 26 in the next available hydrogen storage tank 20 are controlled.

As explained above, in the embodiment of the present invention, a hydrogen supply control device for controlling the supply of hydrogen from the hydrogen storage tanks 20 to the fuel cell 40 is provided. This hydrogen supply control device is provided with a remaining hydrogen estimating unit for estimating the remaining amounts of hydrogen in the hydrogen storage tanks 20. A hydrogen storage tank 20 for supplying hydrogen to the fuel cell 40 is selected based on the estimated remaining amounts of hydrogen inside the hydrogen storage tanks 20. In this case, the electronic control unit 51 forms this remaining hydrogen estimating unit.

Further, in this case, in the embodiment of the present invention, a plurality of hydrogen storage tank insert parts 10 are formed inside the frame 2, at least one hydrogen storage tank 20 is selected from among the hydrogen storage tanks 20 inserted in the hydrogen storage tank insert parts 10, hydrogen is supplied from the selected hydrogen storage tank 20 to the fuel cell 40, and, when the estimated remaining amount of hydrogen of the selected hydrogen storage tank 20 falls below a set amount of hydrogen, at least one next hydrogen storage tank 20 is selected from among the hydrogen storage tanks 20 inserted in the hydrogen storage tank insert parts 10 and hydrogen is supplied from the next selected hydrogen storage tank 20 to the fuel cell 40.

Further, in the embodiment of the present invention, the above mentioned hydrogen supply control device has the display device 57 for displaying the fact that the hydrogen storage tank 20 should be replaced when an estimated remaining amount of hydrogen of the hydrogen storage tank 20 falls below the set amount of hydrogen. Further, in the embodiment of the present invention, the sensor 33 is placed for detecting the state of stored hydrogen in the hydrogen storage tank 20 at the end portion of the hydrogen storage tank 20 at the opposite side to the hydrogen outflow part 23. The above-mentioned remaining hydrogen estimating unit estimates the remaining amount of hydrogen in the hydrogen storage tank 20 based on the detection signal of the sensor 33.

On the other hand, referring again to FIG. 1 and FIG. 4, the service providing mobile unit 1 is provided with the power supply terminal 80 connected to the output terminal of the fuel cell 40, that is, the supply terminal 80 of generated power of the fuel cell 40. Further, the hydrogen inflow branch passage 81 is branched from the hydrogen inflow passage 29, and the service providing mobile unit 1 is provided with the supply terminal 82 of hydrogen connected to this hydrogen inflow branch passage 81. Inside of this hydrogen inflow branch passage 81, the flow rate control valve 83 controlled by the electronic control unit 51 is arranged. In this way, in the embodiment of the present invention, the supply terminal 80 of power generated by the fuel cell 40 is arranged on the frame 2 so as to be able to provide power to the outside. Note that, in the example shown in FIG. 1, the supply terminal 80 of the generated power of the fuel cell 40 and the supply terminal 82 of hydrogen are arranged on the frame 2 facing the service providing space 3. Therefore, in the example shown in FIG. 1, a service providing unit set inside the service providing space 3 can not only use the generated power of the fuel cell 40, but can also use the hydrogen.

What is claimed is:

1. A service providing mobile unit comprising:
a frame,
movement-use wheels provided at a bottom part of the frame,
a plurality of hydrogen storage tank insert parts formed at the frame, and
a fuel cell arranged in the frame, wherein
said service providing mobile unit is able to provide a service for supplying hydrogen to the fuel cell from a hydrogen storage tank inserted in the hydrogen storage tank insert part, a service for lending out the hydrogen storage tank inserted in the hydrogen storage tank insert part, a service for returning a used hydrogen storage tank to the hydrogen storage tank insert part, and a service for storing the hydrogen storage tank inserted into the hydrogen storage tank insert part, and
wherein remaining amounts of hydrogen inside the hydrogen storage tanks inserted in the hydrogen storage tank insert parts are detected, and the service for lending out the hydrogen storage tank is performed based on the detected remaining amounts of hydrogen inside the hydrogen storage tanks.

2. The service providing mobile unit according to claim 1, wherein the service for supplying hydrogen to the fuel cell from the hydrogen storage tank is performed based on the detected remaining amounts of hydrogen inside the hydrogen storage tanks.

3. The service providing mobile unit according to claim 2, wherein when there is a request for loan of the hydrogen storage tank inserted in the hydrogen storage tank insert part, the hydrogen storage tank able to be lent out is determined based on the detected remaining amount of hydrogen inside the hydrogen storage tanks.

4. The service providing mobile unit according to claim 1, wherein states of use of the hydrogen storage tank insert parts are stored in a storage device, and the service for returning a used hydrogen storage tank and the service for storing the hydrogen storage tank are performed based on the states of use of the hydrogen storage tank insert parts stored in the storage device.

5. The service providing mobile unit according to claim 4, wherein when there is a request for return of a used hydrogen storage tank to the hydrogen storage tank insert part, the hydrogen storage tank insert part enabling insertion of the used hydrogen storage tank is determined based on the states of use of the hydrogen storage tank insert parts stored in the storage device.

6. The service providing mobile unit according to claim 4, wherein the storage device is provided in an electronic control unit of a management server, the remaining amount of hydrogen inside the hydrogen storage tank inserted into the hydrogen storage tank insert parts are detected and the detected remaining amount of hydrogen are stored in the storage device, a communication device for communicating with the management server is provided, and, by communicating with the management server using the communication device, the service for supplying hydrogen to the fuel cell from the hydrogen storage tank, the service for lending out the hydrogen storage tank, the service for returning the hydrogen storage tank, and the service for storing the hydrogen storage tank are performed.

7. A service providing mobile unit comprising:
a frame, movement-use wheels provided at a bottom part of the frame, a plurality of hydrogen storage tank insert parts formed at the frame, and a fuel cell arranged in the frame, wherein said service providing mobile unit is able to provide a service for supplying hydrogen to the fuel cell from a hydrogen storage tank inserted in the hydrogen storage tank insert part, a service for lending out the hydrogen storage tank inserted in the hydrogen storage tank insert part, a service for returning a used hydrogen storage tank to the hydrogen storage tank insert part, and a service for storing the hydrogen storage tank inserted into the hydrogen storage tank insert part, and the frame forms a ring shape about a horizontal axis, a service providing space having a ring-shaped inner circumference surface of the frame as its outer edges is formed by the frame, and power can be supplied from the fuel cell to a service providing unit installed inside the service providing space.

8. The service providing mobile unit according to claim 7, wherein the frame is comprised of an upper frame part and lower frame part arranged facing each other and extending in strip shapes and a pair of side frame parts arranged facing each other, these upper frame part, lower frame part, and side frame parts are used to form a square shaped service providing space, and the hydrogen storage tank insert parts are formed in at least one frame part of the side frame parts and the lower frame part.

9. The service providing mobile unit according to claim 7, wherein the frame is provided with a lower frame part extending in a strip shape, a small-sized motor unit having drive wheels is connectable to one end portion of the lower frame part, and driven wheels are attached to another end portion of the lower frame part.

10. The service providing mobile unit according to claim 7, wherein a supply terminal of power generated by the fuel cell is arranged on the frame.

11. The service providing mobile unit according to claim 10, wherein a supply terminal of power generated by the fuel cell and a supply terminal of hydrogen are arranged on the frame.

12. A service providing mobile unit comprising:

a frame, movement-use wheels provided at a bottom part of the frame, a plurality of hydrogen storage tank insert parts formed at the frame, and a fuel cell arranged in the frame, wherein said service providing mobile unit is able to provide a service for supplying hydrogen to the fuel cell from a hydrogen storage tank inserted in the hydrogen storage tank insert part, a service for lending out the hydrogen storage tank inserted in the hydrogen storage tank insert part, a service for returning a used hydrogen storage tank to the hydrogen storage tank insert part, and a service for storing the hydrogen storage tank inserted into the hydrogen storage tank insert part, a hydrogen inflow part connected to the fuel cell is formed in a deep portion of each hydrogen storage tank insert part, a hydrogen outflow part which is coupled with the hydrogen inflow part when the hydrogen storage tank is inserted into the hydrogen storage tank insert part is formed at one end portion of the hydrogen storage tank, a grippable handle is formed at another end portion of the hydrogen storage tank, and a work of inserting the hydrogen storage tank into the hydrogen storage tank insert part and a work of coupling the hydrogen inflow part and the hydrogen outflow part are performed by gripping the handle.

13. The service providing mobile unit according to claim 12, wherein the work of coupling the hydrogen inflow part and the hydrogen outflow part is performed by gripping the handle and rotating the hydrogen storage tank.

14. The service providing mobile unit according to claim 12, wherein the hydrogen inflow part is formed in a projecting shape and the hydrogen outflow part is formed in a recessed shape, and the hydrogen inflow part and the hydrogen outflow part are coupled by fitting the recessed hydrogen outflow part of the hydrogen storage tank onto the projecting hydrogen inflow part.

15. The service providing mobile unit according to claim 14, wherein the recessed hydrogen outflow part and the projecting hydrogen inflow part have a coupling structure where the recessed hydrogen outflow part is coupled with the projecting hydrogen inflow part if the recessed hydrogen outflow part is made to rotate after fitting the recessed hydrogen outflow part into the projecting hydrogen inflow part.

16. The service providing mobile unit according to claim 15, wherein the coupling structure is comprised of a screw structure.

17. The service providing mobile unit according to claim 12, wherein a guide wall for guiding the recessed hydrogen outflow part of the hydrogen storage tank to the projecting hydrogen inflow part when inserting the hydrogen storage tank into the hydrogen storage tank insert part is formed at the hydrogen storage tank insert part.

18. The service providing mobile unit according to claim 17, wherein the guide wall has a cylindrical shape.

19. The service providing mobile unit according to claim 12, wherein a sensor for detecting a state of stored hydrogen inside the hydrogen storage tank is arranged at the other end portion side of the hydrogen storage tank.

20. The service providing mobile unit according to claim 12, wherein two end faces of the hydrogen storage tank are formed from flat surfaces.

21. The service providing mobile unit according to claim 12, wherein a normally closed type outflow control valve for controlling an outflow of hydrogen from the hydrogen storage tank is arranged at the hydrogen outflow part, and a valve opening control device for controlling opening of the outflow control valve is arranged at the hydrogen inflow part.

22. The hydrogen storage apparatus according to claim 12 wherein a hydrogen supply control device for controlling a supply of hydrogen from the hydrogen storage tank to the fuel cell is provided, the hydrogen supply control device has a remaining hydrogen amount estimating unit for estimating a remaining amount of hydrogen inside the hydrogen storage tank, and a hydrogen storage tank for supplying hydrogen to the fuel cell is selected based on the estimated remaining amount of hydrogen inside the hydrogen storage tank.

23. The service providing mobile unit according to claim 22, wherein a plurality of the hydrogen storage tank insert parts are formed inside the frame, at least one hydrogen storage tank is selected from among the hydrogen storage tanks inserted in the hydrogen storage tank insert parts, hydrogen is supplied from the selected hydrogen storage tank to the fuel cell, when the estimated remaining amount of hydrogen of the selected hydrogen storage tank falls below a set amount of hydrogen, at least one next hydrogen storage tank is selected from the hydrogen storage tanks inserted into the hydrogen storage tank insert parts and hydrogen is supplied to the fuel cell from the selected next storage tank.

24. The service providing mobile unit according to claim 22, wherein the hydrogen supply control device has a display device for displaying the fact that the hydrogen storage tank should be replaced when the estimated remaining amount of hydrogen of the hydrogen storage tank falls below the set amount of hydrogen.

25. The service providing mobile unit according to claim 22, wherein a sensor for detecting a state of stored hydrogen inside the hydrogen storage tank is arranged at the other end portion side of the hydrogen storage tank, and the remaining hydrogen amount estimating unit estimates a remaining amount of hydrogen inside the hydrogen storage tank based on a detection signal of the sensor.

* * * * *